(12) United States Patent
Siles et al.

(10) Patent No.: US 10,957,118 B2
(45) Date of Patent: Mar. 23, 2021

(54) TERAHERTZ SENSORS AND PHOTOGRAMMETRY APPLICATIONS

(71) Applicant: International Business Machines Corporation, Armonk, NY (US)

(72) Inventors: Karen Mariela Siles, Austin, TX (US); Jason L. Peipelman, Austin, TX (US); John E. Martin, Austin, TX (US); Zia K. Mohammad, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 16/357,021

(22) Filed: Mar. 18, 2019

(65) Prior Publication Data

US 2020/0302697 A1 Sep. 24, 2020

(51) Int. Cl.
*G06T 19/00* (2011.01)
*G06T 19/20* (2011.01)
(Continued)

(52) U.S. Cl.
CPC ............ *G06T 19/20* (2013.01); *G01N 21/84* (2013.01); *H04N 5/23299* (2018.08);
(Continued)

(58) Field of Classification Search
CPC .............. G06T 19/20; G06T 2210/16; G06T 2219/2004; H04N 5/23299; G01N 21/84; G01N 2021/8444
See application file for complete search history.

(56) References Cited

U.S. PATENT DOCUMENTS 5,623,145 A 4/1997 Nuss
5,797,527 A 8/1998 Lam
(Continued)

FOREIGN PATENT DOCUMENTS

CN 102175662 A 9/2011
CN 202843224 U 4/2013
WO 2018134521 A1 7/2018

OTHER PUBLICATIONS

Clifford Lindsay, Cecil S. Joseph, Michael A. King, Robert H. Giles,"Investigation of the transmission measurements of different clothing types at sub-terahertz for reflection imaging," Proc. SPIE 10917, Terahertz, RF, Millimeter, and Submillimeter-Wave Technology and Applications XII, 109172C (Mar. 1, 2019).*
(Continued)

*Primary Examiner* — Neil R McLean
(74) *Attorney, Agent, or Firm* — Zilka-Kotab, P.C.

(57) ABSTRACT

An apparatus includes a frame configured to suspend an article of clothing and a plurality of terahertz sensors coupled to the frame. The terahertz sensors are configured to image an article of clothing suspended from the frame from different vantage points from within an interior of the article of clothing. Another apparatus includes a frame configured to suspend an article of clothing and a terahertz sensor coupled to the frame and configured to image an article of clothing suspended from the frame from within an interior of the article of clothing. The terahertz sensor is selectively positionable along the frame thereby enabling imaging from different vantage points.

20 Claims, 4 Drawing Sheets

(51) Int. Cl.
    *H04N 5/232*     (2006.01)
    *G01N 21/84*     (2006.01)

(52) U.S. Cl.
    CPC .. *G01N 2021/8444* (2013.01); *G06T 2210/16* (2013.01); *G06T 2219/2004* (2013.01)

(56) References Cited

U.S. PATENT DOCUMENTS

| | | | |
|---|---|---|---|
| 6,415,199 | B1 | 7/2002 | Liebermann |
| 7,133,740 | B1 | 11/2006 | Stenson et al. |
| 7,274,073 | B2 | 9/2007 | Anderson et al. |
| 8,655,053 | B1 | 2/2014 | Hansen |
| 2009/0212217 | A1* | 8/2009 | Mann ............ G02B 26/10 250/334 |
| 2014/0176565 | A1 | 6/2014 | Adeyoola et al. |
| 2017/0000277 | A1* | 1/2017 | Johnson ......... A47G 25/1407 |
| 2017/0061770 | A1* | 3/2017 | DeLuca ........... G08B 5/22 |
| 2017/0193677 | A1* | 7/2017 | Kim ............... G06T 11/003 |

OTHER PUBLICATIONS

Perez, S., "CALA's app fits designer clothing to your body using iPhone photos," TechCrunch, Mar. 23, 2017, pp. 1-6, retrieved from https://techcrunch.com/2017/03/23/calas-app-fits-designer-clothing-to-your-body-using-iphone-photos/.

Vitrionic, "3D Scan for Customized Clothing," VITRIONIC, 2018, 3 pages, retrieved on Aug. 28, 2018 from https://www.vitronic.com/industrial-and-logistics-automation/sectors/3d-body-scanner/3d-scan-for-customized-clothing.html.

Saiki et al., "Exploring Methods to Make 3-D Images of Historic Clothing Using Photogrammetry," Proceedings of the International Textile and Apparel Association, vol. 74, 2017, 3 pages.

Wong et al., "A Three in One Smart Garment Hanger," International Conference on System Science and Engineering, 2010, pp. 50-55.

Potel, M., "3D Scanning in Apparel Design and Human Engineering," IEEE Computer Graphics and Applications, 1996, pp. 11-15.

Knipper et al., "THz Absorption in Fabric and Its Impact on Body Scanning for Security Application," IEEE Transactions on Terahertz Science and Technology, Nov. 2015, vol. 5, No. 6, pp. 999-1004.

Motorola, "2014 Motorola Solutions Shopping Study Key Findings," Motorola presentation, Feb. 2014, pp. 1-34, retrieved from https://www.mmaglobal.com/files/documents/7th_annual_msi_shopping_study_highlights_-_2014.pdf.

Szymczyk, M., "Intelligent Dressing Rooms & Interactive Mirrors Influence Gen Y Shopping Experience (STUDY)," Zugara, Apr. 2018, pp. 1-4, retrieved from http://zugara.com/intelligent-dressing-rooms-interactive-mirrors-influence-gen-y-shopping-experience-study.

Avametric, "Uniquely Accurate Beautifully Rendered," Avametric, 2018, 8 pages, retrieved from https://www.avametric.com/.

Ochwat, D., "The DressingRoom by Gap Mobile App," Shopper Marketing, Mar. 17, 2017, 4 pages, retrived from https://shoppermarketingmag.com/dressingroom-gap-mobile-app.

Amazon, "Amazon Sumerian The fastest and easiest way to create VR, AR, and 3D experiences," Amazon, 2019, 13 pages, retrieved from https://aws.amazon.com/sumerian/.

Amazon, "Virtual Dressing Room," Amazon, 2019, 4 pages, retrieved from https://www.amazon.com/MyCoolLook-com-Virtual-Dressing-Room/dp/B00QJSPI9U.

Wikipedia, "Electromagnetic radiation," Wikipedia, 2019, 14 pages, retrieved from https://en.wikipedia.org/wiki/Electromagnetic_radiation.

Wikipedia, "International Telecommunication Union," Wikipedia, 2019, 10 pages, retrieved from https://en.wikipedia.org/wiki/International_Telecommunication_Union.

Wikipedia, "Hertz," Wikipedia, 2018, 5 pages, retrieved from https://en.wikipedia.org/wiki/Hertz.

Wikipedia, "Micro-," Wikipedia, 2019, 3 pages, retrieved from https://en.wikipedia.org/wiki/Micro-.

Photomodeler Technologies, "Use Your Camera to Measure and Model," Photomodeler Technologies, 2018, 9 pages, retrieved from https://www.photomodeler.com/?gclid=EAlalQobChMl1embiJ_A3gIVhPhkCh3xSww5EAAYAiAAEgJncfD_BwE.

Wogan,T., "New Tuner Could Bring Terahertz to the Masses," Physics World, Jun. 12, 2012, 3 pages, retrieved from https://physicsworld.com/a/new-tuner-could-bring-terahertz-to-the-masses/.

Fraunhofer, "Terahertz Sensors and Systems," Fraunhofer Institute for Telecommunications, Heinrich Hertz Institute, HHI, 2019, 3 pages, retrieved from https://www.hhi.fraunhofer.de/en/departments/pc/research-groups/terahertz-sensors-and-systems.html.

NASA, "Multi-Frequency, Tunable Terahertz Quantum Cascade Laser Source," NASA Technology Transfer Program, 3 pages, retrieved on Jan. 30, 2019, from https://technology.nasa.gov/patent/LEW-TOPS-86.

* cited by examiner

US 10,957,118 B2

TERAHERTZ SENSORS AND PHOTOGRAMMETRY APPLICATIONS

BACKGROUND

The present invention relates to terahertz sensors and photogrammetry, and more specifically, this invention relates to augmented reality (AR) applications of terahertz sensors and photogrammetry.

Terahertz waves (e.g. T-rays, T-waves, T-light, T-lux, or THz) are electromagnetic waves within the International Telecommunication Union (ITU) designated band of frequencies. Terahertz wave frequencies range from 0.3 to 3 terahertz (1 THz=$10^{12}$ Hz). Wavelengths of radiation in the terahertz band range from 0.1 mm to 1 mm (100 µm). Terahertz waves may penetrate various materials. Terahertz waves are non-ionizing and harmless to living tissue, DNA, etc. Measurements of the terahertz beams may be used for material characterization, layer inspection, alternative x-ray techniques, security screening, etc. Terahertz waves may be capable of producing high resolution images of solid objects.

Photogrammetry is the science of making measurements from photographs. Multiple photographs may be used to estimate three-dimensional (3D) coordinates of surface points of an object in an image. The output of photogrammetry is conventionally a map, drawing, measurement, and/or 3D model of the subject of the photographs. Photogrammetry may be used to create maps, in visual special effects, in various engineering applications, for vehicle accident investigations, etc.

SUMMARY

An apparatus according to one embodiment includes a frame configured to suspend an article of clothing and a plurality of terahertz sensors coupled to the frame. The terahertz sensors are configured to image an article of clothing suspended from the frame from different vantage points from within an interior of the article of clothing.

An apparatus according to one embodiment includes a frame configured to suspend an article of clothing and a terahertz sensor coupled to the frame and configured to image an article of clothing suspended from the frame from within an interior of the article of clothing. The terahertz sensor is selectively positionable along the frame thereby enabling imaging from different vantage points.

A computer-implemented method according to one embodiment includes receiving imaging data of an article of clothing suspended from a frame from at least one terahertz sensor coupled to the frame. The imaging data is from multiple vantage points located in an interior of the article of clothing. The method also includes processing the imaging data into a three-dimensional model of the article of clothing and outputting the three-dimensional model.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for scanning and/or modeling clothing using terahertz sensors and photogrammetry.

In one general embodiment, an apparatus includes a frame configured to suspend an article of clothing and a plurality of terahertz sensors coupled to the frame and configured to image an article of clothing suspended from the frame from different vantage points from within an interior of the article of clothing.

In another general embodiment, an apparatus according includes a frame configured to suspend an article of clothing and a terahertz sensor coupled to the frame and configured to image an article of clothing suspended from the frame from within an interior of the article of clothing. The terahertz sensor is selectively positionable along the frame thereby enabling imaging from different vantage points.

In another general embodiment, a computer-implemented method includes receiving imaging data of an article of clothing suspended from a frame from at least one terahertz sensor coupled to the frame. The imaging data is from multiple vantage points located in an interior of the article of clothing. The method also includes processing the imaging data into a three-dimensional model of the article of clothing and outputting the three-dimensional model.

Figure 1:
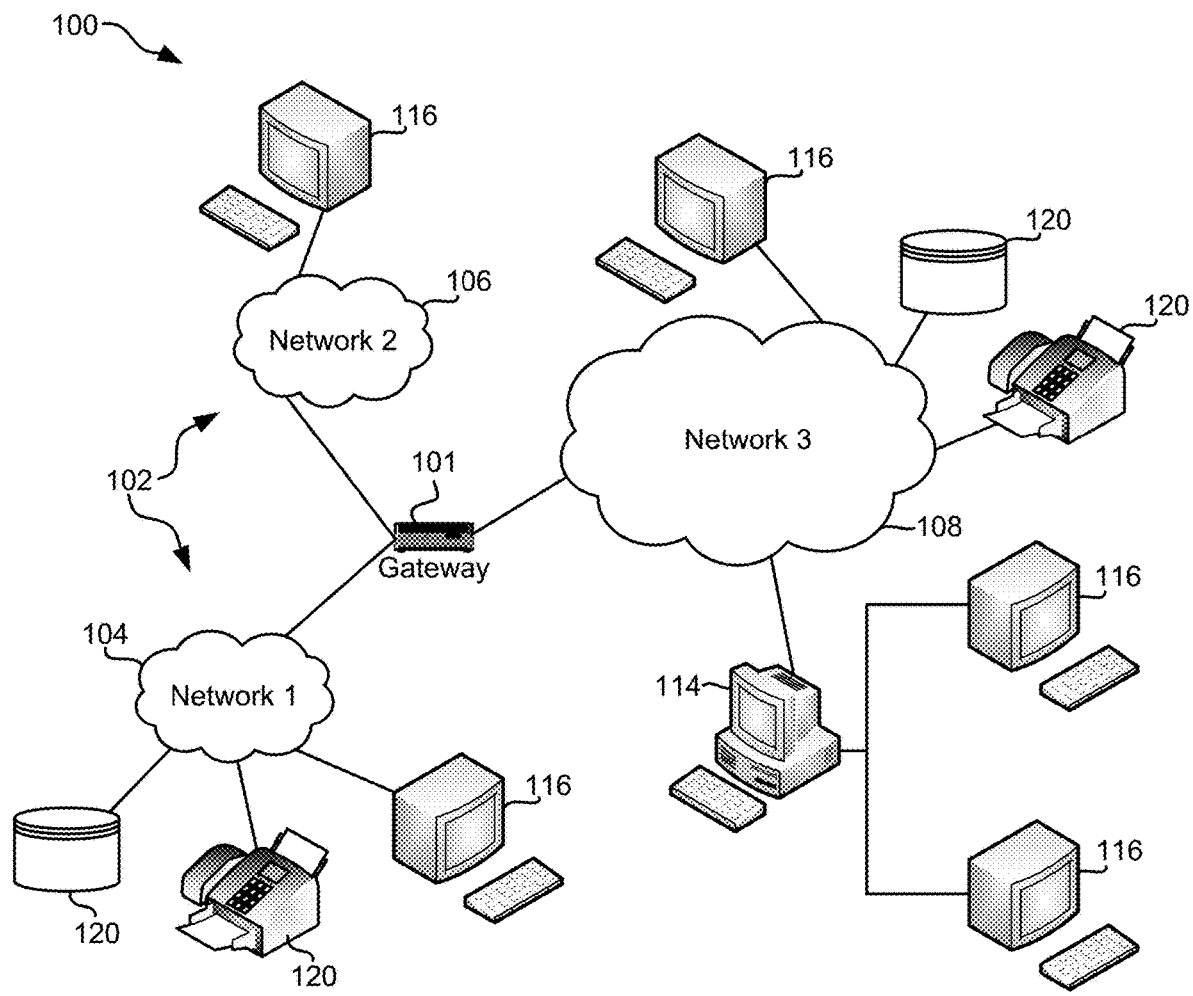
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
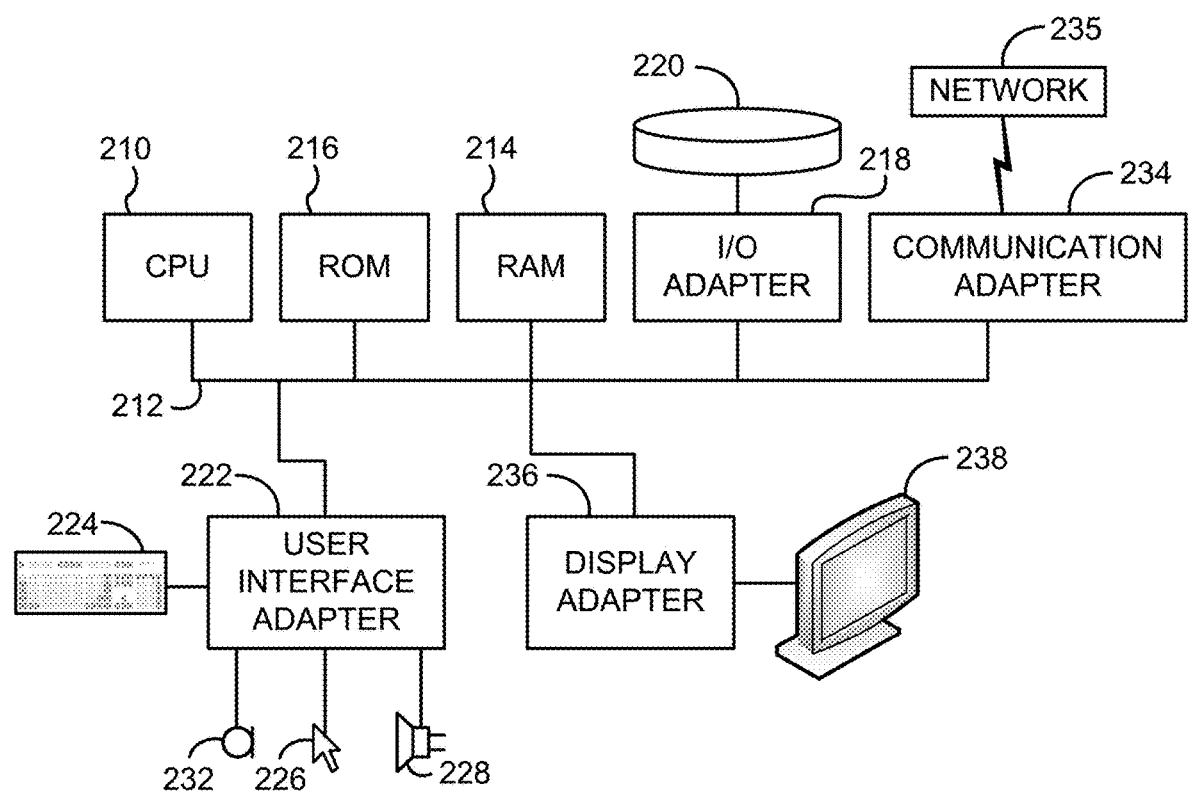
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Consumers within the clothing retail industry are demanding more technology designed to improve their shopping experience. Augmented reality technology may be used to supplement real world environments, including clothing stores. Many companies are taking advantage of consumer demand for AR-assisted clothing shopping by incorporating 3D-modeled clothing and/or humans into online shopping applications. However, creating individual 3D models of clothing using computer-aided design (CAD) software is expensive and/or time consuming. The high cost of entry prevents smaller retailers and/or individuals from taking advantage of AR technology.

In various embodiments disclosed herein, an apparatus and method for creating 3D models of clothing, including various characteristics of the clothing, are described. Such characteristics may include the shape, the fabric types, the thickness, etc. of the clothing. Photogrammetry techniques and/or terahertz sensors may be used to characterize the clothing and/or provide a 3D model of the clothing.

Figure 3:
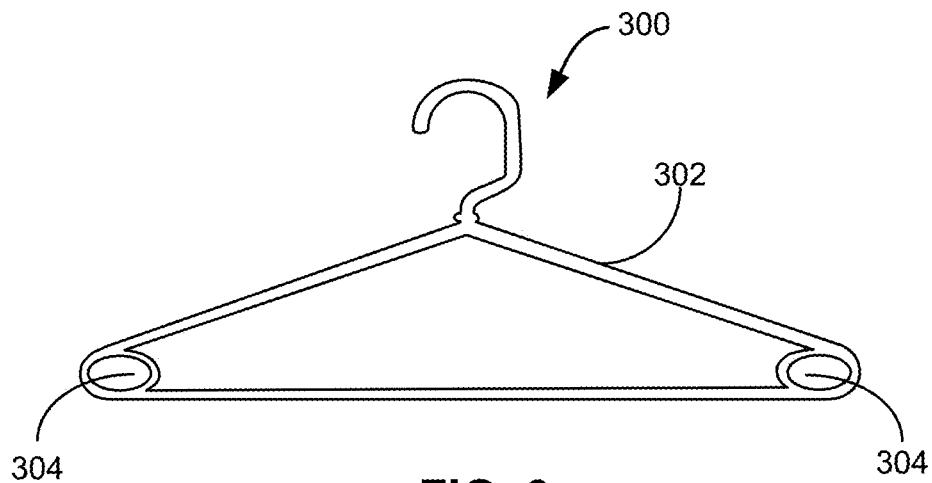
FIG. 3 is an exemplary apparatus according to one embodiment.

FIG. 3 depicts an apparatus 300 for scanning and/or modeling clothing, in accordance with one embodiment. As an option, the present apparatus 300 may be implemented in conjunction with features from any other embodiment listed herein, such as those described with reference to the other FIGS. Of course, however, such apparatus 300 and others presented herein may be used in various applications and/or in permutations which may or may not be specifically described in the illustrative embodiments listed herein. Further, the apparatus 300 presented herein may be used in any desired environment.

As shown, the apparatus 300 comprises a frame 302 and a plurality of terahertz sensors 304 coupled to the frame. The plurality of terahertz sensors may be coupled to the frame in any manner known in the art.

In one embodiment, the frame 302 may be configured to suspend an article of clothing. In one approach, the frame has a shape of a hanger (as shown in FIG. 3). In another approach, the frame has a shape of a human body or portion thereof. An exemplary implementation of a frame which has a shape of a human body or portion thereof may be a mannequin. In other approaches, the frame 302 may be a rack, a hook, clasp, or any other means of suspending an article of clothing.

It should be noted that, although FIG. 3 depicts a frame in the shape of a hanger, various inventive embodiments described herein should not be limited to a hanger configuration.

In one approach, the frame 302 may comprise a processor (not shown). The processor may comprise software for photogrammetry, the terahertz sensors, controlling software, etc. The processor may begin to process imaging data in response to a user engaging a button on the frame, via a remote connection (e.g. Bluetooth), etc. In response to gathering imaging data from the plurality of terahertz sensors and/or at least one image capturing device, in a simplified example, the processor may compile the imaging data and send the imaging data to the appropriate software for output as a 3D model of the article of clothing according to various embodiments. See also FIG. 5 for an exemplary method of use of the frame 302.

In one embodiment, the plurality of terahertz sensors 304 are coupled to the frame. The plurality of terahertz sensors may include two, at least three, or more terahertz sensors. The terahertz sensors may be any terahertz sensors which are known in the art.

In one approach, the plurality of terahertz sensors 304 coupled to the frame are configured for imaging an article of clothing suspended from the frame. The plurality of terahertz sensors may be capable of imaging the article of clothing from different vantage points from within an interior of an article of clothing. The plurality of terahertz sensors may scan through the article of clothing from the interior of the article of clothing in order to build a 3D model of the entire article of clothing. It should be noted that although the plurality of terahertz sensors are depicted as two terahertz sensors 304, each located at either end of the frame 302, one having ordinary skill in the art would understand that there may be more than two terahertz sensors coupled to the frame in any configuration and location.

In a preferred embodiment, the terahertz sensors are capable of scanning at various frequencies in order to detect and/or characterize fabrics of various materials, types, shapes, thicknesses, etc. In a preferred approach, the terahertz sensors may scan the article of clothing suspended from the frame at different frequencies. The scans at different frequencies may provide characteristic data for the article of clothing.

In some embodiments, the apparatus comprises and/or communicates with at least one image capturing device (not shown). The image capturing device may be capable of gathering imaging data for photogrammetry applications. The image capturing device may provide imaging data for surface features of the article of clothing (e.g. patterns, colors, shading, etc.) which the plurality of terahertz sensors do not identify. The image capturing device may be a camera, a smart phone, a tablet, or any device known in the art which is capable of capturing images.

In one approach, the image capturing device is located inside the article of clothing when the article of clothing is suspended from the frame 302. In another approach, the image capturing device is located outside the article of clothing when the article of clothing is suspended from the frame 302. In yet another approach, there may be an image capturing device located inside the article of clothing and an image capturing device located outside the article of clothing. In each approach, the image capturing device may be selectively positionable as to capture imaging data from multiple vantage points.

Figure 4:
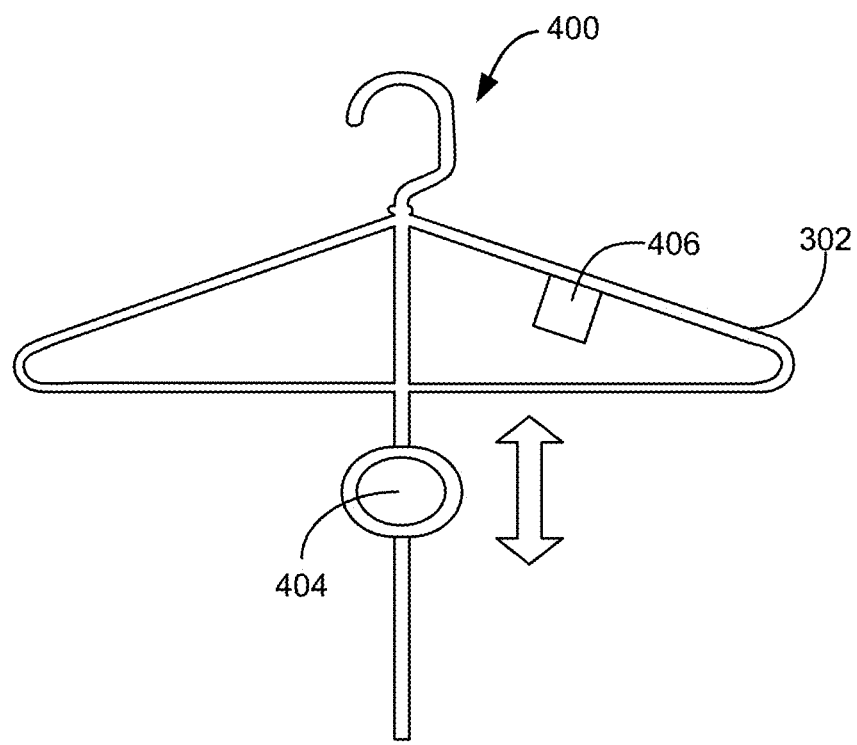
FIG. 4 is an exemplary apparatus according to one embodiment.

FIG. 4 depicts an apparatus 400 for scanning and/or modeling clothing, in accordance with one embodiment. As an option, the present apparatus 400 may be implemented in conjunction with features from any other embodiment listed herein, such as those described with reference to the other FIGS. Of course, however, such apparatus 400 and others presented herein may be used in various applications and/or in permutations which may or may not be specifically described in the illustrative embodiments listed herein. Further, the apparatus 400 presented herein may be used in any desired environment.

As shown, the apparatus 400 comprises a frame 302 and a terahertz sensor 404 coupled to the frame. The terahertz sensor may be coupled to the frame in any manner known in the art.

In one embodiment, the frame 302 may be configured to suspend an article of clothing. In one approach, the frame has a shape of a hanger (as shown in FIG. 4). In another approach, the frame has a shape of a human body or portion thereof. An exemplary implementation of a frame which has a shape of a human body or portion thereof may be a mannequin. In other approaches, the frame 302 may be a rack, a hook, clasp, or any other means of suspending an article of clothing.

It should be noted that although FIG. 4 depicts a frame in the shape of a hanger, the various inventive embodiments described herein should not be limited to a hanger configuration.

In one approach, the frame 302 may comprise a processor (not shown). The processor may comprise software for photogrammetry, the terahertz sensors, controlling software, etc. The processor may begin processing the imaging data in response to a user engaging a button on the frame, via a remote connection (e.g. Bluetooth), etc. In response to gathering imaging data from the terahertz sensor and/or at least one image capturing device, in a simplified example, the processor may compile the imaging data and send the imaging data to the appropriate software for output as a 3D model of the article of clothing according to various embodiments. See also FIG. 5 for an exemplary method of use of the frame 302.

In one embodiment, the terahertz sensor 404 is coupled to the frame. The terahertz sensor may be any terahertz sensor known in the art.

In one approach, the terahertz sensor 404 coupled to the frame is configured for imaging an article of clothing suspended from the frame. The terahertz sensor 404 may be selectively positionable for imaging the article of clothing from within an interior of the article of clothing. The terahertz sensor 404 may be selectively positionable for imaging the article of clothing from different vantage points. The terahertz sensor 404 may scan through the article of clothing from the interior of the article of clothing in order to build a 3D model of the entire article of clothing. The terahertz sensor 404 may be positioned manually by a user, via an integrated positioning system of the frame 302 (e.g., a worm screw, actuator, pulley system, etc.), etc. In a preferred embodiment, the terahertz sensor 404 is automatically selectively positioned in various predefined positions in response to initiating the operations of method 500, in response to a user engaging a button on the apparatus, a user-initiated command via a remote connection, etc. It should be noted that although a single terahertz sensor is depicted along a rod positioned in the middle of the frame 302, one having ordinary skill in the art would understand that there may be more than one terahertz sensor which are selectively positionable and coupled to the frame in any configuration.

In a preferred embodiment, the terahertz sensor is capable of scanning at various frequencies in order to detect and/or characterize fabrics of various materials, types, shapes, thicknesses, etc. In a preferred approach, the terahertz sensor may scan the article of clothing suspended from the frame at different frequencies. The scans at different frequencies may provide characteristic data for the article of clothing.

In some embodiments, the apparatus comprises at least one image capturing device 406. The image capturing device 406 may be capable of gathering imaging data for photogrammetry applications. The image capturing device 406 may provide imaging data for surface features of the article of clothing (e.g. patterns, colors, shading, etc.) which the terahertz sensor does not identify. The image capturing device 406 may be a camera, a smart phone, a tablet, or any device known in the art which is capable of capturing images.

In one approach, the image capturing device 406 is located inside the article of clothing when the article of clothing is suspended from the frame 302 as shown. In another approach, the image capturing device is located outside the article of clothing when the article of clothing is suspended from the frame 302. In yet another approach, an image capturing device 406 may be located inside the article of clothing and an image capturing device 406 may be located outside the article of clothing. In each approach, the image capturing device may be selectively positionable as to capture imaging data from multiple vantage points.

Figure 5:
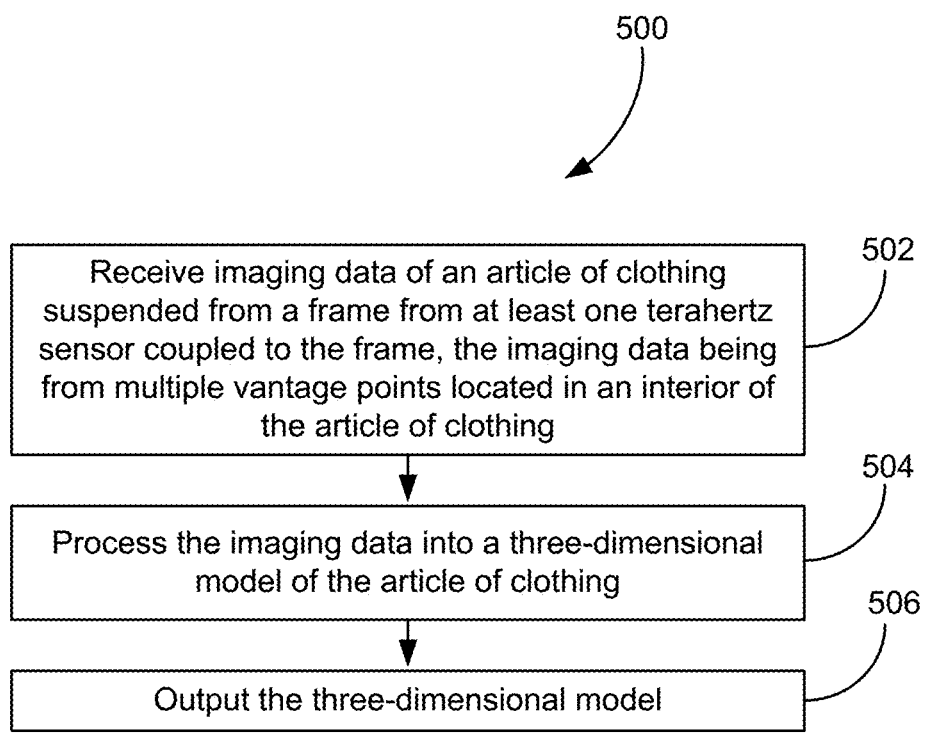
FIG. 5 is a flowchart of a method according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502 which includes receiving imaging data of an article of clothing suspended from a frame from at least one terahertz sensor coupled to the frame, the imaging data being from multiple vantage points located in an interior of an article of clothing. The imaging data may correspond to individual signals propagated through distinct points on the article of clothing, pre-processed for the image, spectral information in the time domain for creating an image, etc. The imaging data may comprise photogrammetry imaging data from one or more image capturing devices.

The imaging data may be received in any manner known in the art. In one approach where operation 502 and/or method 500 is performed by an apparatus such as one of the apparatuses shown in FIGS. 3-4, the imaging data may be received by an onboard processor from the terahertz sensors and/or image capturing device. In another approach where operation 502 and/or method 500 is performed by a remote device in communication with such an apparatus, the imaging data may be received from the apparatus wirelessly, via wired connection, via memory transfer (e.g., using a memory card), etc.

Operation 504 includes processing the imaging data into a three-dimensional model of the article of clothing. Operation 504 may comprise processing imaging data from at least one terahertz sensor from various vantage points, and optionally imaging data from at least one image capturing device. In one approach, imaging data from one or more terahertz sensors may be processed into a three-dimensional model of the article of clothing. In a preferred approach, operation 504 includes processing imaging data from at least one terahertz sensor and at least one image capturing device. The imaging data from at least one image capturing device may be from various vantage points. The imaging data from the sensor(s), and from the image capturing device(s) if present, may be merged to generate a 3D model of the article of clothing.

In one approach, operation 504 may include processing the imaging data using any photogrammetry software and/or combination of image processing techniques known in the art.

In one approach, the imaging data gathered via an image capturing device may be used to generate various overlays usable with the 3D model of the article of clothing. The overlays may include different patterns, textures, styles, shapes, etc. which are interchangeable within the 3D and/or overlaying the 3D model. In one approach, the overlays may be different than the actual appearance of the modeled article of clothing.

Operation 506 includes outputting the model. In one approach, the output is a 3D model of the processed data. The model may be output in any form known in the art. In various approaches, the model may be "blank slate" which one of ordinary skill in the art may use for various processes.

Various embodiments include using the 3D model created by method 500. A preferred embodiment includes using the 3D model in AR clothing shopping applications. For example, the model may be used for allowing a user to try on clothing they wish to buy. The user may be located in a store, at home, or any other location. In another example, the various embodiments described herein may be used to generate 3D models of a user's wardrobe such that the user may try on clothes which they already own in order to choose an outfit, to determine if an outfit still fits properly, etc.

The various embodiments describe herein disclose cost-effective and efficient methods and apparatuses for generating and using 3D models of articles of clothing. The ability to more economically create 3D models of clothing may allow smaller retailers to offer the services which are similar to services offered by larger clothing retailers. These services in turn result in increased profits by engaging consumers who avoid shopping in person and/or fitting rooms. AR assisted shopping and 3D models may also reduce returns, especially for online shoppers who conventionally buy clothing without the ability to try on the articles of clothing beforehand.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a frame configured to suspend an article of clothing;
a plurality of terahertz sensors coupled to the frame and configured to image an article of clothing suspended from the frame from different vantage points from within an interior of the article of clothing, wherein the plurality of terahertz sensors are configured to scan the article of clothing suspended from the frame at different frequencies, wherein the scans at different frequencies provide characteristic data associated with the article of clothing;
an image capturing device imaging an interior of the article of clothing suspended from the frame being selectively positionable to image from different vantage points; and
a processor configured to process imaging data from the plurality of terahertz sensors and imaging data from the image capturing device into a three-dimensional model of the article of clothing.

2. The apparatus of claim 1, wherein the frame has a shape of a clothing hanger.

3. The apparatus of claim 1, wherein the frame has a shape of a human body or portion thereof.

4. The apparatus of claim 1, wherein the plurality of terahertz sensors comprises at least three terahertz sensors.

5. The apparatus of claim 1, wherein the characteristic data associated with the article of clothing includes a characteristic selected from the group consisting of: a material type of the article of clothing, a shape of the article of clothing, and a thickness of the article of clothing.

6. The apparatus of claim 1, comprising a second image capturing device imaging an exterior of the article of clothing suspended from the frame being selectively positionable to image from different vantage points, wherein the processor is configured to process imaging data from the second image capturing device with the imaging data from the plurality of terahertz sensors and the imaging data from the image capturing device.

7. The apparatus of claim 1, wherein the plurality of terahertz sensors are selectively positionable via an integrated positioned system of the frame.

8. The apparatus of claim 1, wherein the processor is integrated into the frame.

9. An apparatus, comprising:
a frame configured to suspend an article of clothing; and
a terahertz sensor coupled to the frame and configured to image an article of clothing suspended from the frame from within an interior of the article of clothing, the terahertz sensor being selectively positionable along the frame thereby enabling imaging from different vantage points, wherein the terahertz sensor is selectively positionable via an integrated positioned system of the frame in response to a user-initiated command via a remote connection.

10. The apparatus of claim 9, wherein the frame has a shape of a clothing hanger.

11. The apparatus of claim 9, wherein the frame has a shape of a human body or portion thereof.

12. The apparatus of claim 9, wherein the terahertz sensor being selectively positionable along the frame for imaging from at least two different vantage points.

13. The apparatus of claim 9, wherein the terahertz sensor is configured to scan the article of clothing suspended from the frame at different frequencies.

14. The apparatus of claim 13, wherein the scans at different frequencies provide characteristic data associated with the article of clothing.

15. The apparatus of claim 9, comprising an image capturing device imaging the interior of an article of clothing suspended from the frame being selectively positionable to image from different vantage points.

16. The apparatus of claim 9, comprising an image capturing device imaging an exterior of an article of clothing suspended from the frame being selectively positionable to image from different vantage points.

17. A computer-implemented method, comprising:
receiving imaging data of an article of clothing suspended from a frame from at least one terahertz sensor coupled to the frame, the imaging data being from multiple vantage points located in an interior of the article of clothing;
receiving imaging data of an interior of the article of clothing suspended from the frame from at least one image capturing device, the imaging data being from multiple vantage points;
processing the imaging data into a three-dimensional model of the article of clothing; and
outputting the three-dimensional model.

18. The computer-implemented method of claim 17, comprising generating three-dimensional overlays usable with the three-dimensional model of the article of clothing.

19. The computer-implemented method of claim 18, wherein the three-dimensional overlays usable with the three-dimensional model of the article of clothing are different from the three-dimensional model of the article of clothing.

20. The computer-implemented method of claim 17, wherein processing the imaging data into the three-dimensional model of the article of clothing includes processing imaging data of the article of clothing suspended from the frame from the at least one image capturing device, the imaging data being from multiple vantage points, and the imaging data of the article of clothing suspended from a frame from the at least one terahertz sensor coupled to the frame, the imaging data being from multiple vantage points.

* * * * *